United States Patent [19]

Kishimoto et al.

[11] 4,446,499
[45] May 1, 1984

[54] INPUT PROTECTION CIRCUIT

[75] Inventors: Satoru Kishimoto; Masaharu Atsumi, both of Kakogawa; Yoshiaki Sano, Kawasaki, all of Japan

[73] Assignees: Fujitsu Ten Limited, Kobe; Fujitsu Limited, Kawasaki, both of Japan

[21] Appl. No.: 384,634

[22] Filed: Jun. 3, 1982

[30] Foreign Application Priority Data

Jun. 5, 1981 [JP] Japan ................................ 56-86451

[51] Int. Cl.³ .............................................. H02H 7/09
[52] U.S. Cl. ................................ 361/92; 307/200 A; 364/184
[58] Field of Search ................. 361/92; 307/200 A; 364/184

[56] References Cited

U.S. PATENT DOCUMENTS 4,099,068  7/1978  Kobayashi et al. ............... 361/92 X
4,232,236  11/1980  Yomogida et al. ............... 361/92 X

FOREIGN PATENT DOCUMENTS 55-100748  7/1980  Japan ............................ 307/200 A

OTHER PUBLICATIONS

IBM Technical Disclosure Bulletin vol. 20, No. 3, Aug. 1977, "Anti-Disturb Power On/Off Circuit"—Gersbach.

Primary Examiner—Harry E. Moose, Jr.
Attorney, Agent, or Firm—Staas & Halsey

[57] ABSTRACT

A clamping transistor is connected to a signal input terminal of a signal processing circuit, such as a microprocessor, which operates on the output voltage from a stabilized power source circuit. When the output voltage from the stabilized power source circuit is below a predetermined value at the time of turning ON or OFF a power source switch, the clamping transistor is held in the ON state, thereby preventing the application of an input signal of a level higher than the power source voltage of the signal processing circuit, to the signal input terminal of the signal processing circuit.

6 Claims, 3 Drawing Figures

INPUT PROTECTION CIRCUIT

BACKGROUND OF THE INVENTION

1. Field of the Invention

The present invention relates to an input protection circuit for a signal processing circuit, such as a microprocessor or the like.

2. Description of the Prior Art

In an automotive vehicle or the like, a system is used which applies an output signal from each of temperature, pressure and like sensors to a signal processing circuit, such as a microprocessor or the like, and controls respective parts, such as an engine or the like, in accordance with the sensor output signal. There are cases where a power source voltage, e.g. of a battery, is applied as a power source voltage $V_{CC}$ to the signal processing circuit after being converted by a stabilized power source circuit into 5 V, for instance, and the power source voltage $V_B$ as of the battery is provided directly to the sensor. In such a system, the power source voltage $V_B$ is immediately applied to the sensor when turning ON a power source switch, but since the output voltage $V_{CC}$ of the stabilized power source circuit does not immediately rise up, the level of the sensor output signal may sometimes exceed the voltage applied to the signal processing circuit.

In general, since the signal processing circuit, such as a microprocessor, is broken down when the input signal level becomes higher than the power source voltage applied thereto, it is necessary that the input signal be provided to the signal processing circuit after the output voltage from the stabilized power source circuit has risen to its highest level. To meet this requirement, it is considered to provide a switch which applies the power source voltage to the sensors after complete rise-up of the stabilized power source circuit, but an arrangement including control of the switch becomes complex because the sensors are disposed at various positions.

SUMMARY OF THE INVENTION

It is therefore an object of the present invention to provide a simple-structured input protection circuit which protects a signal processing circuit, such as a microprocessor or the like, by clamping the level of an input signal to the signal processing circuit at the time of turning ON and OFF the power source, so that the input signal level may not exceed the power source voltage applied to the signal processing circuit.

Briefly stated, according to the present invention, a clamping transistor is held in the ON state until the output voltage of a stabilized power source rises up to a predetermined value, thereby clamping the sensor output signal applied to an input terminal of a signal processing circuit, such as a microprocessor, so that the sensor output signal voltage may not become higher than the power source voltage provided to the signal processing circuit.

DESCRIPTION OF THE PREFERRED EMBODIMENTS

Figure 1:
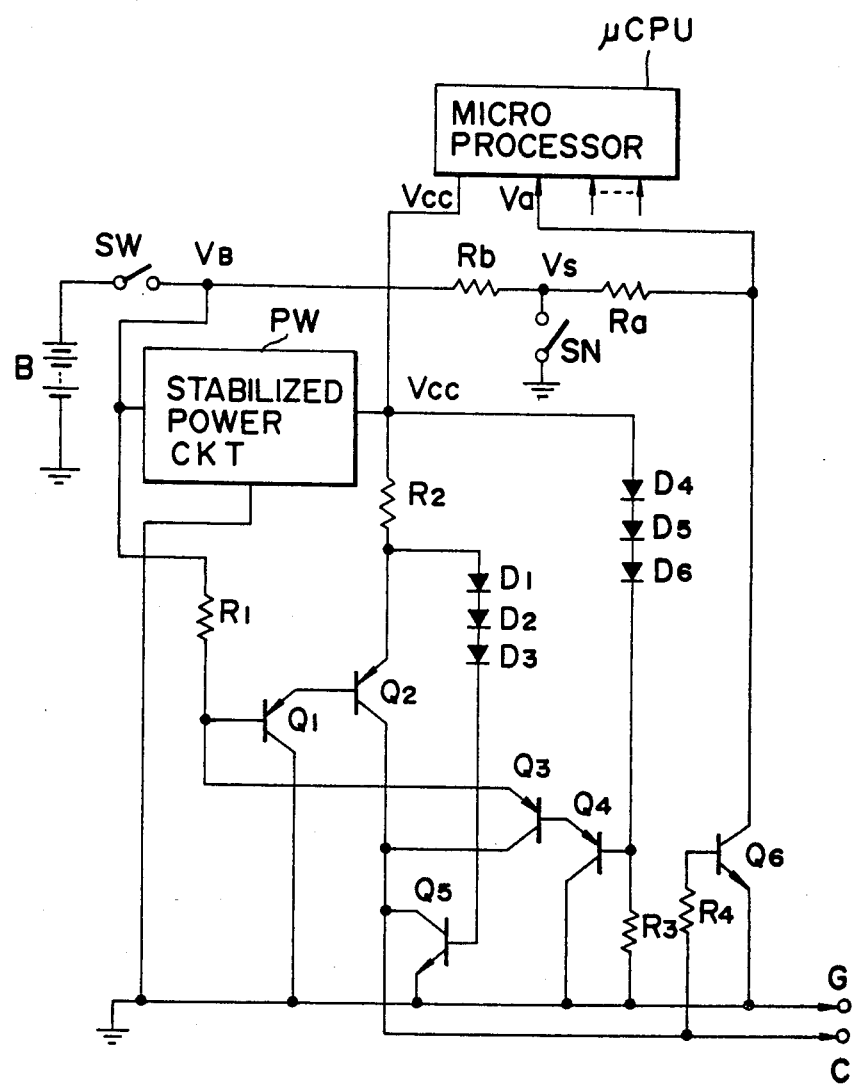
FIG. 1 is a circuit diagram of the principal part of an embodiment of the present invention.

In FIG. 1 there is shown the principal part of an embodiment of the present invention, in which a battery B is used as the power source, the output voltage from a stabilized power source circuit PW including a DC-DC converter, is applied as the power source voltage $V_{CC}$ to a microprocessor $\mu$CPU. A sensor SN which performs an ON-OFF operation, is used as a temperature, pressure or like sensor. In FIG. 1, reference characters Q1 to Q6 indicate transistors; R1 to R4, Ra and Rb designate resistors; D1 to D6 identify diodes; and SW denotes a power source switch. The microprocessor $\mu$CPU and the stabilized power source circuit PW are of known arrangements.

Upon turning ON the power source switch SW, a voltage $V_B$ of the battery B is applied to the stabilized power source circuit PW and, via the resistor Rb, to the sensor SN. At the same time, the voltage $V_B$ is provided via the resistor R1 to the base of the transistor Q1 and the emitter of the transistor Q3. The output signal from the sensor SN is applied, via the resistor Ra, to an input terminal of the microprocessor $\mu$CPU, and the transistor Q6 is also connected to this input terminal.

Figure 2:
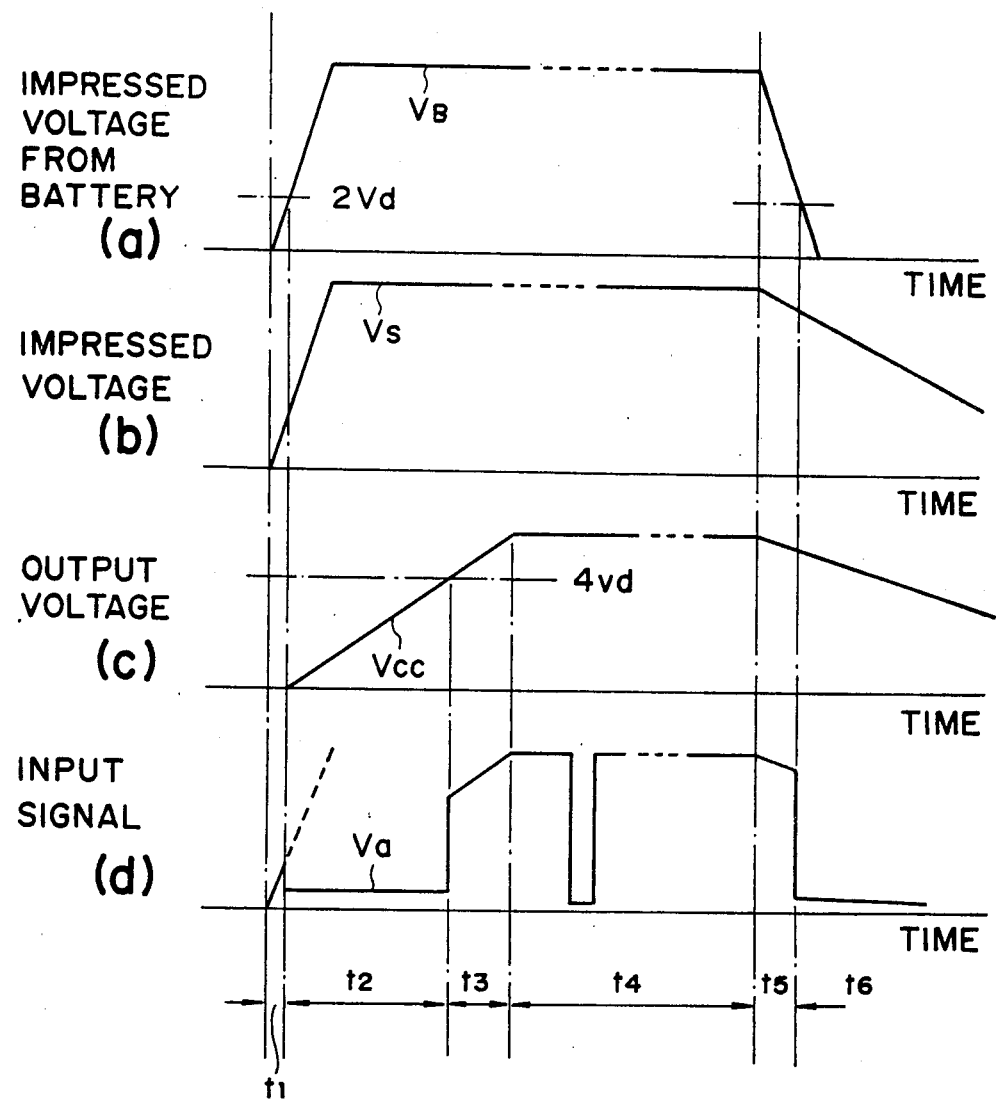
FIGS. 2(a)-2(d) are graphs for explaining the operation of the circuit depicted in FIG. 1.

FIG. 2 is explanatory of the operation of the embodiment shown in FIG. 1. Upon turning ON the power source switch SW, the voltage $V_B$ which is applied from the battery B to the microprocessor $\mu$CPU and the stabilized power source circuit PW rapidly rises up as shown in FIG. 2(a) and, at the same time, a voltage $V_S$ to the sensor SN also rises up as shown in FIG. 2(b). On the other hand, the stabilized power source circuit PW becomes operative to start generating the output voltage $V_{CC}$ after the voltage $V_B$ has reached a value at which the DC-DC converting operation can be started, and until the output voltage $V_{CC}$ becomes stable, it slowly rises up as shown in FIG. 2(c) due to an operation lag caused by a capacitor and the like in the stabilized power source circuit PW.

The base of the transistor Q4 is supplied with a voltage derived from dividing the voltage $V_{CC}$ through the diodes D4 to D6 and the resistor R3, and the base of the transistor Q5 is supplied with the voltage $V_{CC}$ via the transistor R2 and the diodes D1 to D3. When the voltage $V_B$ has become higher than 2 Vd (base-emitter forward voltages of the transistors Q3 and Q4) a time t1 after turning ON of the power source switch SW, a current flows via a route (resistor R1-emitter and base of transistor Q3-emitter and base of transistor Q4-resistor R3) to turn ON the transistors Q3 and Q4, and the collector current of the transistor Q3 flows across the base and emitter of the transistor Q6 via the resistor R4 to turn ON the transistor Q6. Consequently, an input signal Va to the input terminal of the microprocessor $\mu$CPU is clamped at the saturation voltage of the transistor Q6.

When the voltage $V_{CC}$ of the stabilized power source circuit PW has risen to exceed a voltage 4 Vd (voltages across the diodes D1 to D3 and a base-emitter forward voltage of the transistor Q5), the transistor Q5 is turned ON, by which the base current of the transistor Q6, flowing via the transistor Q3, is bypassed to turn OFF the transistor Q6, and the base potential of the transistor Q4 also rises to turn OFF the transistors Q3 and Q4. In other words, the input voltage of the microprocessor $\mu$CPU can be clamped at the saturation voltage of the transistor Q6 for a period of time t2.

In the next period of time t3 to t5, the transistor Q6 remains OFF (the microprocessor μCPU being operative) and, for example, upon turning ON the sensor SN, the input signal Va becomes low-level. Incidentally, the time t1 is very short in practice. Since the voltage $V_{CC}$ is substantially zero-potential, no problem occurs even if the input signal Va exceeds the power source voltage $V_{CC}$ of the microprocessor μCPU as shown in FIG. 2(d).

In the case of the power source switch SW being turned OFF, the voltage $V_B$ sharply falls as shown in FIG. 2(a) but the voltage $V_S$ to the sensor SN falls slowly as shown in FIG. 2(b) by virtue of the presence of a wired capacitance, a noise preventing capacitor (not shown) and so forth. The voltage $V_{CC}$ of the stabilized power source circuit PW also drops slowly as shown in FIG. 2(c) because of the presence of its internal capacitor and so on. With such voltage characteristics, the level of the input signal to the microprocessor μCPU may sometimes become unstable thereby causing a malfunction but when the voltage $V_B$ has become lower than the emitter-base voltages 2 Vd of the transistors Q1 and Q2, the transistors Q1 and Q2 are turned ON and the emitter potential of the transistor Q2 becomes lower than 4 Vd. As a result, the transistor Q5 is turned OFF and the collector current of the transistor Q2 is supplied via the resistor R4 to the base of the transistor Q6 to turn it ON, clamping the input signal Va to the microprocessor μCPU at the saturation voltage of the transistor Q6. Accordingly, as shown in FIG. 2(d), the input signal Va falls with a decrease in the voltage $V_S$ in the period of time t5 and thereafter it is clamped at the saturation voltage of the transistor Q6.

In the case where a plurality of sensors SN are provided, transistors, each corresponding to the transistor Q6, are connected to input terminals of the microprocessor μCPU corresponding to the sensors SN and a terminal C is connected via resistors to the bases of the transistors. Further, a terminal G is used as a ground terminal; therefore, this circuit structure can easily be fabricated as an integrated circuit.

Figure 3:
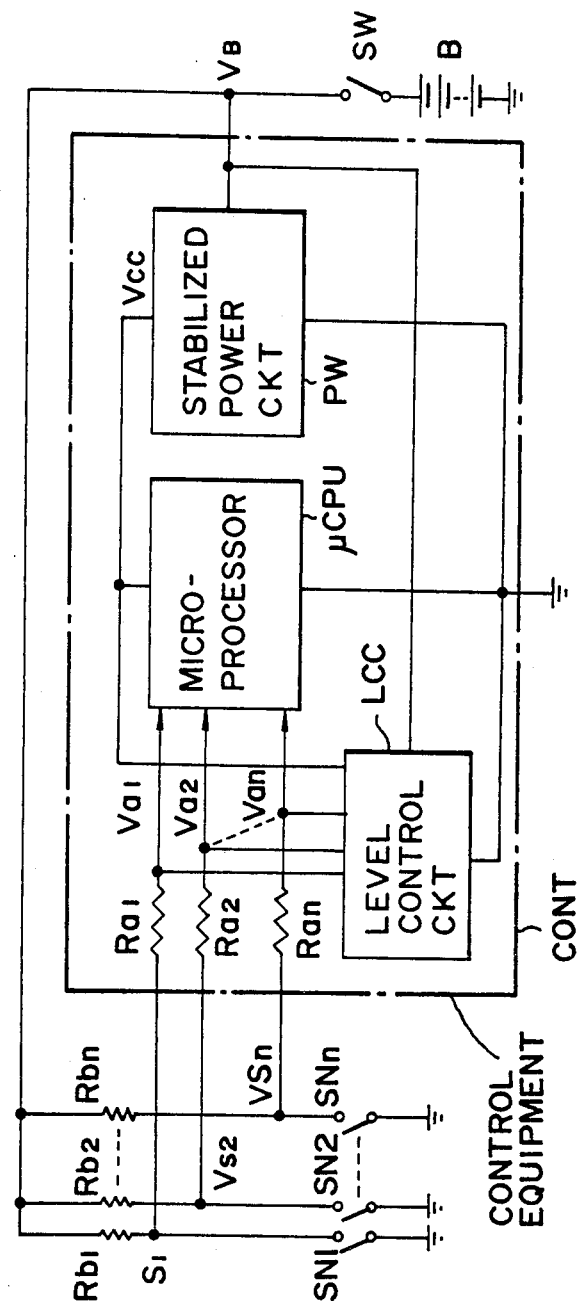
FIG. 3 is a block diagram illustrating another embodiment of the present invention.

FIG. 3 illustrates in block form an embodiment of the present invention in which a plurality of sensors SN₁ to SNn are provided. By turning ON the power source switch SW, the voltage $V_B$ is applied from the battery B and voltages $V_{S1}$ to $V_{Sn}$ are provided to the sensors SN₁ to SNn via resistors Rb1 to Rbn, respectively. Output signals from the sensors SN₁ to SNn are provided to the microprocessor μCPU of a controller CONT via resistors Ra1 to Ran, respectively, and the input signals Va1 to Van are controlled to be within a predetermined level range by a level control circuit LCC including an input protection circuit. As shown in FIG. 1, when the power source switch SW is turned ON and OFF, the input signals Va1 to Van of the microprocessor μCPU are clamped to the level of the ground potential or a level close thereto. This delays the rise and fall of the voltage $V_{CC}$ of the stabilized power source PW to ensure that the input signals Va1 to Van become larger than the power source voltage of the microprocessor μCPU.

Although the foregoing embodiments have been described in connection with the case of using ON-OFF type sensors, the present invention is also applicable to the case of employing analog signal output type sensors, and the microprocessor may also be replaced with other signal processing circuits formed by an MOS integrated circuit and the like. The number of series connections of the diodes D1 to D6 can be selected in relation to the voltages $V_B$, $V_{CC}$ and so forth. Furthermore, the power source may also be a DC power source other than a battery.

As has been described in the foregoing, according to the present invention, the clamping transistor Q6 is connected to the input terminal of a signal processing circuit, such as the microprocessor μCPU. The transistors Q3 and Q4 are provided for keeping the clamping transistor Q6 in the ON state until the output voltage $V_{CC}$ of the stabilized power source circuit PW rises up to its predetermined value after turning ON of the power source switch. The transistors Q1 and Q2 are provided for turning ON when the output voltage $V_{CC}$ of the stabilized power source circuit PW has dropped lower than a predetermined value after turning OFF of the power source switch SW. With such an arrangement, if is possible to prevent malfunctioning of the signal processing circuit at the time of turning ON and OFF of the power source switch SW and a breakdown of the signal processing circuit resulting from an increase in the input signal level in excess of the power source voltage.

It will be apparent that many modifications and variations may be effected without departing from the scope of the novel concepts of the present invention.

What is claimed is:

1. An input protection circuit for a signal processing circuit having an input terminal for receiving an output of a sensor and having a power source switch connected to a power source, the signal processing circuit being supplied with an output voltage of a stabilized power source circuit connected to the power source switch, said input protection circuit comprising:
   a clamping transistor connected to the input terminal of said signal processing circuit;
   first means, operatively connected to said clamping transistor, for holding said clamping transistor in an ON state until the output voltage from the stabilized power source circuit rises up to a first predetermined value after the power source switch is turned ON; and
   second means for placing said clamping transistor in the ON state when the output voltage of the stabilized power source circuit becomes lower than a second predetermined value.

2. An input protection circuit according to claim 1, wherein said first means includes means for supplying a current to the base of said clamping transistor to hold it in the ON state until the output voltage from the stabilized power source circuit rises up to the first predetermined value after the power source switch is turned ON,
   wherein said second means includes means for supplying a current to the base of said clamping transistor to turn said clamping transistor ON when the output voltage of the stabilized power source circuit becomes lower than the second predetermined value after the power source switch is turned OFF, and
   wherein said input protection circuit further comprises third means for bypassing the base current of said clamping transistor to hold it in the OFF state after the output voltage of the stabilized power source circuit exceeds the first predetermined value after the power source switch is turned ON and until the output voltage of the stabilized power source circuit becomes lower than the second predetermined value after the power source switch is turned OFF.

3. An input protection circuit, operatively connected to receive an external voltage, for a signal processing circuit having a power supply terminal and a first input terminal, comprising:
- a power source switch operatively connected to receive the external voltage, said power source switch providing the external voltage when it is turned ON;
- a stabilized power source circuit, operatively connected to said power source switch and the power supply terminal of the signal processing circuit, for providing an output voltage to the power supply terminal of the signal processing circuit;
- a first sensor, operatively connected to said power source switch and operatively connected to the first input terminal of the signal processing circuit at a first node;
- a first clamping transistor having a first terminal connected at the first node and having second and third terminals;
- first means, operatively connected to the second terminal of said first clamping transistor and to said power source switch, for holding said clamping transistor in an ON state until the output voltage of said stabilized power source circuit rises up to a first predetermined value after said power source switch is turned ON;
- second means, operatively connected to said stabilized power source circuit, said first clamping transistor, and said first means, for holding said first clamping transistor in an OFF state after the output voltage of said stabilized power source circuit exceeds the first predetermined value after said power source switch is turned ON and until the output voltage of said stabilized power source circuit becomes lower than a second predetermined value; and
- third means, operatively connected to said second means, said power source switch, and said first clamping transistor, for placing said first clamping transistor in the ON state when the output voltage of said stabilized power source circuit becomes lower than the second predetermined value.

4. An input protection circuit as set forth in claim 3, wherein the first terminal of said first clamping transistor is a collector,
wherein the second terminal of said first clamping transistor is a base,
wherein the third terminal of said first clamping transistor is an emitter connected to a reference potential,
wherein said first means comprises:
- a first transistor having a base operatively connected to said stabilized power source circuit, having a collector operatively connected to the reference potential and having an emitter; and
- a second transistor having a base operatively connected to the emitter of said first transistor, having a collector operatively connected to the base of said first clamping transistor at a second node and having an emitter operatively connected to said power source switch;

wherein said second means comprises:
- a diode operatively connected to said stabilized power source circuit; and
- a third transistor having a base operatively connected to said diode, having an emitter operatively connected to the reference potential, and having a collector operatively connected to the collector of said second transistor; and wherein said third means comprises:
- a fourth transistor having a base operatively connected to said power source switch, having a collector operatively connected to the reference potential, and having an emitter; and
- a fifth transistor having a base operatively connected to the emitter of said fourth transistor, having a collector operatively connected at the second node, and having an emitter operatively connected to said stabilized power source circuit.

5. An input protection circuit as set forth in claim 4, wherein the signal processing circuit has a second input terminal, and wherein said input protection circuit further comprises:
- a second sensor, operatively connected to said power source switch and operatively connected to the second input terminal of the signal processing circuit at a third node; and
- a second clamping transistor having a collector operatively connected to the second input terminal of the signal processing circuit at the third node, having a base operatively connected at the second node, and having an emitter operatively connected to the reference potential.

6. An input protection circuit as set forth in claim 3, wherein the signal processing circuit has a second input terminal, and wherein said input protection circuit further comprises:
- a second sensor, operatively connected to said power source switch and to the second input terminal of the signal processing circuit; and
- a second clamping transistor having a first terminal operatively connected to the second input terminal of the signal processing circuit, and having a second terminal operatively connected to said first means and said third means.

* * * * *

UNITED STATES PATENT AND TRADEMARK OFFICE
CERTIFICATE OF CORRECTION

PATENT NO. : 4,446,499
DATED : MAY 1, 1984
INVENTOR(S) : SATORU KISHIMOTO ET AL.

It is certified that error appears in the above-identified patent and that said Letters Patent is hereby corrected as shown below:

Col. 2, line 46, "2 Vd" should be --2Vd--;
        line 59, "4 Vd" should be --4Vd--.

Col. 3, line 22, "2 Vd" should be --2Vd--;
        line 25, "4 Vd" should be --4Vd--.

Col. 4, line 33, after "circuit" insert --which has an input--;
        line 43, after "means" insert --operatively connected to said clamping transistor--; and "placing" should be --holding--;
        line 44, "output" should be --input--;
        line 57, "output" should be --input--;
        line 67, "output" should be --input--.

Col. 5, line 38, "output" should be --input--;
        line 45, "output" should be --input--.

Signed and Sealed this

Thirteenth Day of November 1984

[SEAL]

Attest:

GERALD J. MOSSINGHOFF

Attesting Officer

Commissioner of Patents and Trademarks